US007235015B2

United States Patent
Margerie et al.

(10) Patent No.: US 7,235,015 B2
(45) Date of Patent: Jun. 26, 2007

(54) COMPACT CONSTANT VELOCITY JOINT

(75) Inventors: Michel Margerie, Vetheuil (FR);
 Joffrey Turbant, Carrieres Sous Poissy (FR); Christian Chan Tien, Andresy (FR); Marc Francois, Noisy le Roi (FR)

(73) Assignee: GKN Driveline International GmbH (DE)

( * ) Notice: Subject to any disclaimer, the term of this patent is extended or adjusted under 35 U.S.C. 154(b) by 88 days.

(21) Appl. No.: 10/889,932

(22) Filed: Jul. 13, 2004

(65) Prior Publication Data

US 2005/0192104 A1    Sep. 1, 2005

(30) Foreign Application Priority Data

Jul. 16, 2003    (FR)    .................................. 03 08687

(51) Int. Cl.
 *F16D 3/205*    (2006.01)
(52) U.S. Cl. ...................................... 464/111; 464/905
(58) Field of Classification Search ................ 464/111, 464/123, 124, 905
 See application file for complete search history.

(56) References Cited

U.S. PATENT DOCUMENTS

| 2001/0041621 A1 | 11/2001 | Sugiyama et al. |
| 2001/0046899 A1 | 11/2001 | Sugiyama et al. |
| 2002/0032063 A1 | 3/2002 | Watanabe et al. |

OTHER PUBLICATIONS

Universal Joint and Driveshaft Design Manual, AE-7, Society of Automotive Enginners, Inc., Warrendale, PA, p. 137, TJ1079-S62 1979.*

* cited by examiner

*Primary Examiner*—Greg Binda

(57) ABSTRACT

A constant velocity joint includes a male element (4) having at least two trunions (8) and a shaft (12) with an outside diameter (DAE). A respective wheel (32) is mounted to rotate on each trunion (8). The joint also includes a female element (20) having, for each wheel (32), a pair of paths (22, 24) and defining a path primary circle (PCD). The ratio of the outside diameter (DAE) of the shaft (12) to the path primary circle diameter (PCD) is greater than 0.55.

19 Claims, 2 Drawing Sheets

("PRIOR ART")

COMPACT CONSTANT VELOCITY JOINT

TECHNICAL FIELD

The present invention relates to tripod constant velocity joints.

BACKGROUND OF THE INVENTION

Tripod constant velocity joints, such as joints of the "GI" type sold by GKN Driveline S.A., typically include a male element having at least two trunions and a shaft extending along a first axis and having an outside diameter (DAE). Each of the trunions is provided with a rolling surface which extends along a respective second axis, in particular an axis perpendicular to the first axis, and which has a rolling surface diameter (DSR). For each trunion, a wheel mounted on the trunion rotates about the second axis, and is free to slide along said axis. The wheel has an outside diameter (DGE). A female element comprises, for each wheel, a pair of paths and defines a primary circle path.

U.S. Publication No. 2002/0032063 A1 describes a constant velocity joint of the foregoing type having dimensional proportions with specific ratios for the purpose of reducing the size or bulk of the joint while obtaining equilibrium between its structural strength and its service life.

The structural strength of a joint relates to the mechanical strengths of the elements making up the joint when subjected to static and dynamic stresses. The service life of the joint relates to the ability of the contact surfaces of the paths, the wheels, and the needles to withstand wear, such as scaling.

According to U.S. Publication No. 2002/0032063 A1, the parameters that have an influence on structural strength are, amongst others, shaft diameter (ds), trunion diameter, wheel wall thickness, and wheel width. The parameters that have an influence on service life are the diameter (PCD) of the primary circle of the guide paths, trunion diameter, needle length, and needle diameter.

The joint of U.S. Publication No. 2002/0032063 A1 has a ratio of shaft diameter (ds) over path primary circle diameter (PCD) that lies in the range 0.5 to 0.55. The ratio of wheel width over wheel outside diameter is equal to or less than 0.32, and preferably lies in the range 0.27 to 0.24. The ratio of trunion diameter over wheel diameter lies in the range 0.54 to 0.57.

Automotive applications for such joints demand at least equivalent service life in still more compact packages.

SUMMARY OF THE INVENTION

The present invention provides a constant velocity joint of even smaller size for given structural strength and service life.

To this end, the invention provides a constant velocity joint of the above-specified type, wherein the ratio of the outside diameter (DAE) of the shaft over the diameter (PCD) of the path primary circle, referred to as the first ratio of the joint, is greater than 0.55.

In particular embodiments, the joint of the invention includes a constant velocity joint wherein the first ratio is greater than 0.56 or less than 0.59.

In another aspect, each wheel has an axial width (LG) measured along the axis of the wheel (Z—Z), and the ratio of the axial width (LG) over the outside diameter (DGE) of the wheel, referred to as the second ratio of the joint, is in the range of 0.28 to 0.32. In one embodiment, the second ratio is between 0.30 and 0.31.

In a further aspect of the invention, the ratio of the diameter (DSR) of the rolling surface to the outside diameter (DGE) of the wheel, referred to as the third ratio of the joint, is in the range of 0.53 to 0.58.

In another aspect of the invention, the ratio of the diameter (DSR) of the rolling surface to the outside diameter (DAE) of the shaft, referred to as the fourth ratio of the joint, is greater than 0.86 and can lie in the range of 0.86 to 0.91.

In yet a further aspect of the invention, needles are disposed between each rolling surface and each wheel, and the ratio of the length (LA) of the needles over the diameter (DSR) of the rolling surface, referred to as the fifth ratio of the joint, is at least 0.56 and less than 0.61, and can be less than 0.58.

In still a further aspect of the invention, the wheel has an outside diameter (RGE), and each path has a cross-section with a radius (RGE), and the ratio of the wheel over the radius (RP) of the cross-sections, referred to as the sixth ratio of the joint, is less than 1.0, and can be less than 0.997 or even less than 0.93.

In another aspect, the female element defines a small inside diameter (DFP) which is twice the inside radius of the portions extending between adjacent pairs of paths and the ratio of the diameter (DFP) over the outside diameter (DAE) of the shaft, referred to as the seventh ratio of the joint, is in the range of 1.83 to 1.92.

In a still further aspect, the wheel is moveable only in rotation about the second axis (Y—Y) and along said axis. The wheel can include a substantially cylindrical inside surface and the rolling surface of the trunion can be a substantially cylindrical surface as well. The needles can roll on both the rolling surface of the wheel and the rolling surface of the trunion. The trunion and the rolling surface can be fixed relative to the first axis (X—X).

Other advantages and features of the invention will also become apparent upon reading the following detailed description and appended claims, and upon reference to the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention.

DETAILED DESCRIPTION OF THE DRAWINGS

Figure 1:
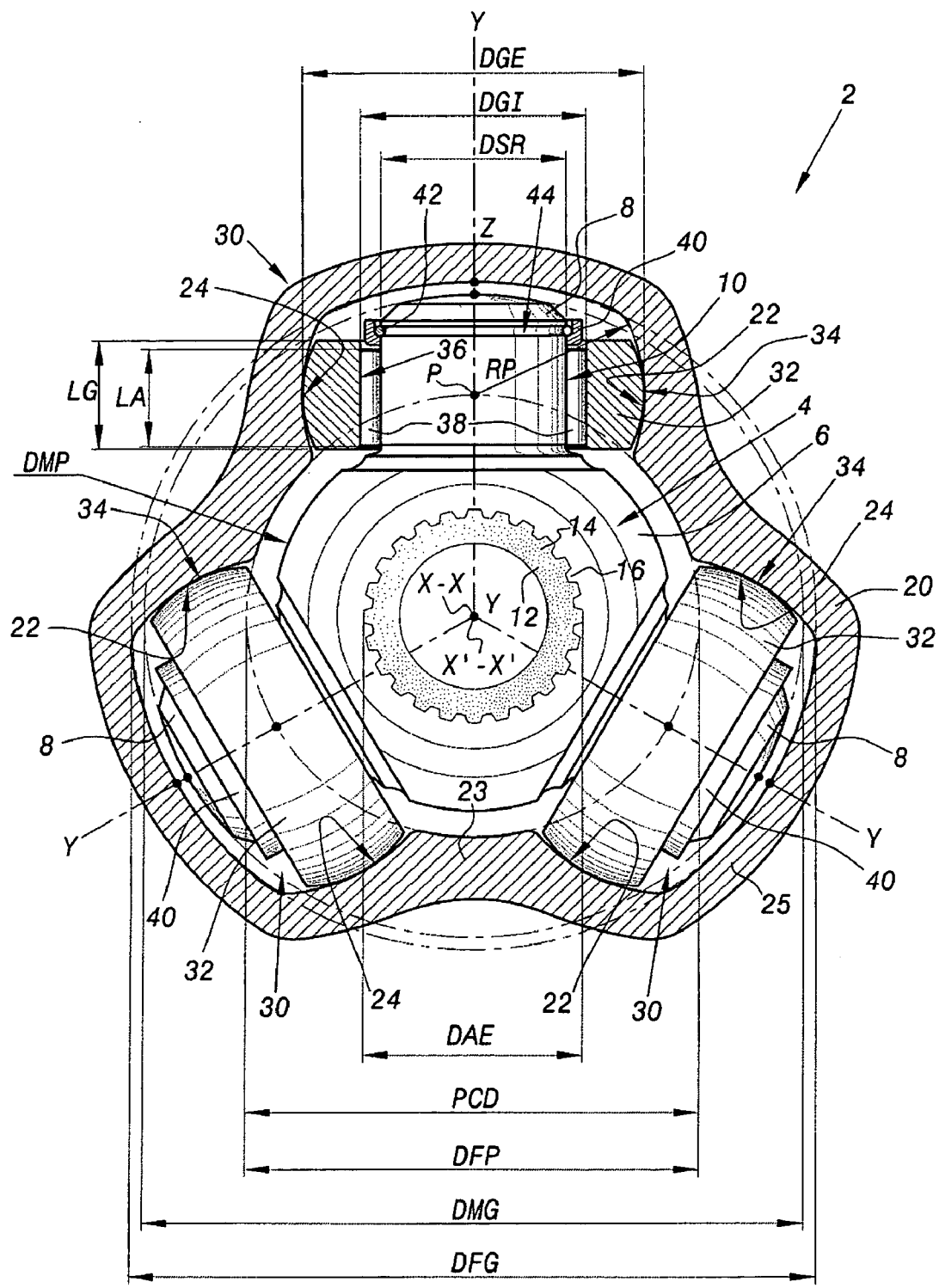
FIG. 1 is a cross-section view of a prior art constant velocity joint.
Figure 2:
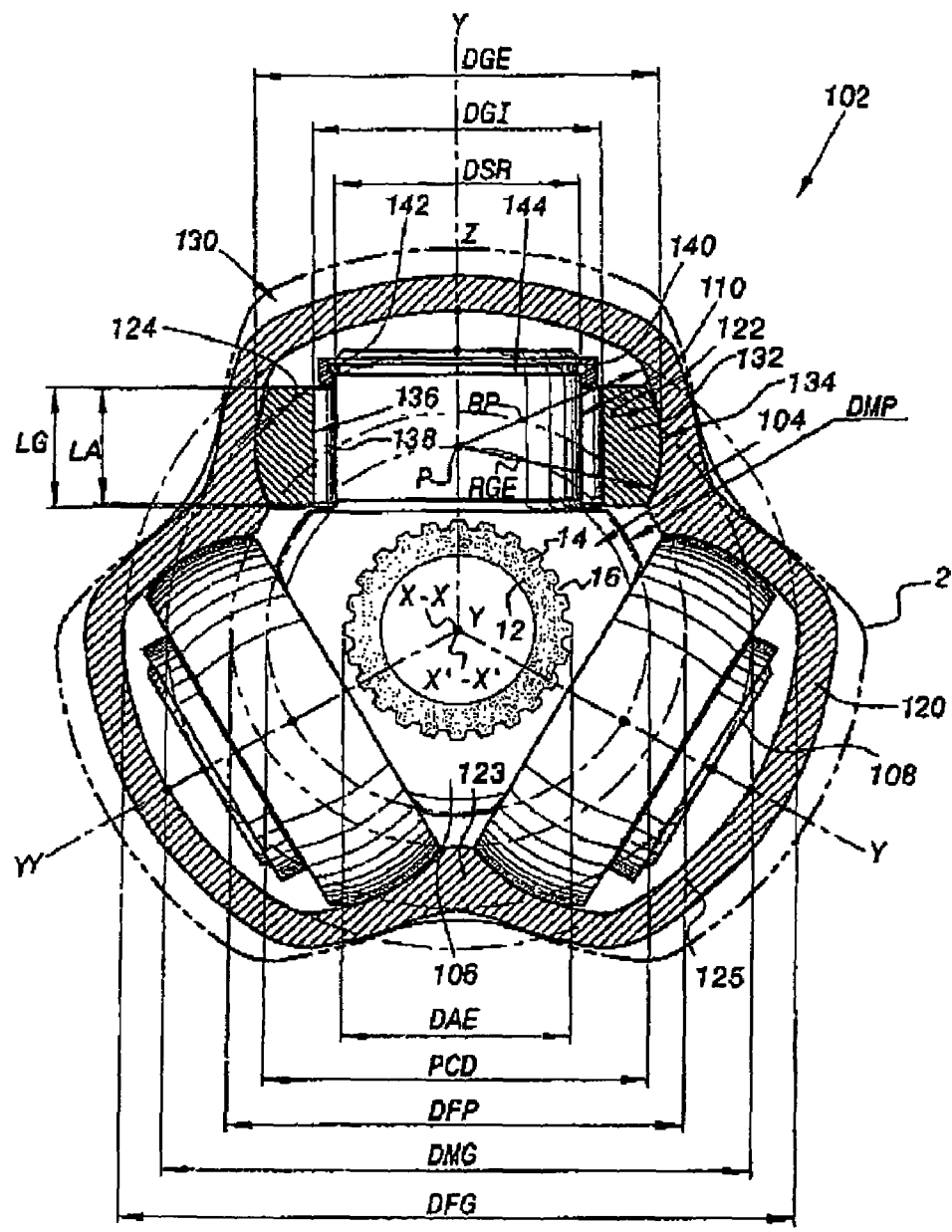
FIG. 2 shows a constant velocity joint according to one embodiment of the invention, in a view analogous to that of FIG. 1.

The two joints shown in FIGS. 1 and 2 differ primarily in their geometrical proportions. Thus, for simplicity, the following describes the features of the joint of FIG. 1 with the understanding that the same description applies to the joint of FIG. 2, with modified components indexed by 100.

The joint 2 is particularly suited for use in a motor vehicle driveline and comprises a male element 4 or tripod, a female element 20 or tulip, and for each trunion 8 of the male element 4, a mechanical transmission element which comprises a wheel 32.

The male element 4 or tripod has three-way symmetry about a central axis X—X (orthogonal to the plane of the figures), which comprises a hub 6 and three radial trunions 8 of respective axes Y—Y that are angularly spaced apart at 120° intervals. Each trunion 8 has a substantially cylindrical rolling surface 10 of diameter DSR centered on the axis Y—Y of the respective trunion. The male element 4 has a small outside diameter DMP which is defined by the outside diameter of the hub 6, and a large outside diameter DMG which is twice the radial length of a trunion 8 measured along its axis X—X.

The hub 6 is secured to a first rotary shaft 12 by way of complementary fluting 14, 16 on the hub 6 and the shaft 12. The shaft 12 has an outside diameter DAE which is defined by the outside diameter of the fluting 14 of the shaft.

The trunion 8 and the rolling surface 10 are fixed relative to the first axis X—X.

The female element 20 or tulip has three-way symmetry about a central axis X'—X', which axis coincides with the axis X—X when the joint 2 is in its aligned position, as shown. On either side of each trunion 8, the tulip 20 defines a pair of facing rolling paths 22, 24. The female element 20 is secured to a second rotary shaft (not shown). The tulip 20 defines a small inside diameter DFP which is twice the inside radius of the portions 23 extending between two pairs of adjacent paths 22, 24, and a large inside diameter DFG which is twice the inside radius of the arch 25 situated between the paths 22, 24 of a pair of paths.

The paths 22, 24 are of circularly arcuate cross-section with a radius RP centered on a point P for each pair of paths. In a conventional manner, the paths 22, 24 define a path primary circle centered on the axis X'—X' and passing through the three points P. The diameter of this circle is referred to as PCD.

For each trunion 8, the mechanical transmission member 30 which comprises a wheel 32 has an axis of revolution Z—Z coinciding with the axis Y—Y. The wheel 32 is designed to roll on one or the other of the corresponding paths 22, 24.

Each wheel 32 has an outside surface 34 that is in the form of part of a sphere. The outside surface 34 has a diameter DGE. The wheel 32 also comprises an inside rolling surface 36 that is substantially cylindrical about the axis Z—Z and that has a diameter DGI. The wheel is of width LG measured along the axis Z—Z. Thus, the wheel 32 can move only in rotation about the second axis X—X and also along said axis.

Furthermore, the transmission member 30 has a ring of roller needles 38 rolling both on the rolling surface 36 of the wheel 32 and on the rolling surface 10 of the trunion 8. The ring of needles 38 is retained axially on the trunion 8 by a retaining ring 40 and by a split ring 42 snap-fastened in a groove 44 formed in the end of the trunion 8. The needles 38 are of length LA.

The parameters that have an influence on the size and the service life of the joint are essentially the width LG of the wheels 32, the diameter PCD of the path primary circle and the outside diameter DGE of the wheels. Nevertheless, the magnitude of the influence of each of these parameters on size and on service life is different. Calculation and exhaustive testing has shown, surprisingly, that the parameter that is most penalizing in terms of size is the diameter PCD, but that reducing this diameter leads to a reduction in service life that is only relatively small, whereas the three parameters mentioned above, the parameter which has the least influence on size and the most influence on service life is the wheel outside diameter DGE.

The joint of the present invention thus provides a ratio of shaft outside diameter DAE over path primary circle diameter PCD that is greater than 0.55. This ratio can be greater than 0.56 and less than 0.59.

The ratio of the width LG of a wheel 32 over the wheel outside diameter DGE lies in the range 0.28 to 0.32, and can be in the range 0.30 to 0.31.

The ratio of the rolling surface diameter DSR over the wheel outside diameter DGE lies in the range 0.53 to 0.58.

Furthermore, the ratio of the rolling surface diameter DSR over the shaft outside diameter DAE is greater than 0.86, and can lie in the range of 0.86 to 0.91. This also results in improved service life of the joint.

The ratio of needle length LA over rolling surface diameter DSR is advantageously at least 0.56 and less than 0.61, and can be less than 0.58.

Furthermore, the ratio of the inside small diameter DFP over the inside large diameter DFG of the tulip 20 is selected to lie in the range 0.65 to 0.68. The ratio of the small diameter DMP of the male element 4 over the large diameter DMG of the male element is selected to lie in the range 0.55 to 0.6, and can be in the range of 0.57 to 0.58.

The ratio of the small inside diameter of the tulip DFP over the shaft outside diameter DAE lies in the range 1.83 to 1.92. Thus, this ratio is large and leads to a large range in the misalignment/sliding diagram for the tulip and the male element. In other words, the joint makes a large bend angle possible for a given relative displacement between the male element 4 and the female element 20.

In addition, the wheel outside diameter DGE is twice the wheel outside radius RGE.

The ratio of the outside radius RGE of the wheel 32 over the radius RP of the paths 22, 24 is less than 1.0, such as less than 0.997, and in particular less than 0.93. This ratio avoids high contact pressure at the axial ends of the surfaces 34 and the paths 22, 24, and it leads to the generation of a weak axial reaction force and to weak vibrations.

In FIG. 2, the outside of the FIG. 1 joint is represented by hidden lines 2. It can be seen that the joint of the present invention is more compact (less bulky). Corresponding components have been given the same reference numerals as those of FIG. 1. indexed by 100.

By using the above-specified proportions, the joint is more compact for given structural strength and service life. In addition, the joint of the invention generates little vibration and little noise while in operation.

While the invention has been described in connection with several embodiments, it should be understood that the invention is not limited to those embodiments. Thus, the invention covers all alternatives, modifications, and equivalents as may be included in the spirit and scope of the appended claims.

What is claimed is:

1. A constant velocity joint comprising:
a male element (4) having at least two trunions (8) and a shaft (12) extending along a first axis (X—X) and having an outside diameter (DAE), defined by an outer diameter of fluting on said shaft, each of the trunions (8) having a rolling surface (10) which extends along a respective second axis (Y—Y), perpendicular to the first axis (X—X), and which has a rolling surface diameter (DSR);
for each trunion (8), a wheel (32) mounted on the trunion (8) to rotate about the second axis (Y—Y), and free to slide along said axis, the wheel (32) having an outside diameter (DGE); and a female element (20) comprising, for each wheel (32), a pair of facing rolling paths (22, 24), and defining a path primary circle centered on the first axis (X—X) and formed by three points (P) wherein each point is a center of an arc corresponding to said facing rolling paths;

wherein a first joint ratio defined as a ratio of the outside diameter (DAE) of the shaft (12) to a diameter (PCD) of the path primary circle is greater than 0.55, and wherein each wheel (32) has an axial width (LG) measured along an axis of the wheel (Z—Z), and wherein a second joint ratio defined as a ratio of the axial width (LG) to the outside diameter (DGE) of the wheel (32) is between 0.28 and 0.32.

2. A constant velocity joint according to claim 1, wherein said first joint ratio is greater than 0.56.

3. A constant velocity joint according to claim 1, wherein said first joint ratio is less than 0.59.

4. A constant velocity joint according to claim 1, wherein said second joint ratio is between 0.30 to 0.31.

5. A constant velocity joint according to claim 1, wherein a third joint ratio defined as a ratio of a diameter (DSP) of the rolling surface (10) to the outside diameter (DGE) of the wheel (32) is between 0.53 to 0.58.

6. A constant velocity joint according to claim 1, wherein a fourth joint ratio defined as a ratio of the diameter (DSR) of the rolling surface (10) to the outside diameter (DAE) of the shaft, is greater than 0.86.

7. A constant velocity joint according to claim 6, wherein the fourth joint ratio is between 0.86 and 0.91.

8. A constant velocity joint according to claim 1, comprising needles (38) disposed between each rolling surface (10) and each wheel (32), and wherein a fifth joint ratio defined as a ratio of a length (LA) of the needles (38) to the diameter (DSR) of the rolling surface (10), is at least 0.56 and less than 0.61.

9. A constant velocity joint according to claim 8, wherein said fifth joint ratio is less than 0.58.

10. A constant velocity joint according to claim 8, wherein each wheel (32) is movable only in rotation about the second axis (Y—Y) and along said axis.

11. A constant velocity joint according to claim 10, wherein each wheel (32) includes a substantially cylindrical inside surface (36), and wherein the rolling surface (10) of the trunion (8) is substantially cylindrical.

12. A constant velocity joint according to claim 11, wherein the needles (35) roll both on the rolling surface (36) of the wheel (32) and on the rolling surface (10) of the trunion (8).

13. A constant velocity joint according to claim 1, wherein the wheel (32) has an outside diameter (RGE), wherein each path (22, 24) has a cross-section with a radius (PP), and wherein a sixth joint ratio defined as a ratio of the outside diameter (RGE) of the wheel to the radius (RP) of the cross-sections, is less than 1.0.

14. A constant velocity joint according to claim 13, wherein said sixth joint ratio is less than 0.93.

15. A constant velocity joint according to claim 1, wherein the female element (20) defines a small inside diameter (DEP) which is twice an inside radius of portions (23) extending between two adjacent pairs of paths (22, 24), and wherein a seventh joint ratio defined as a ratio of the small inside diameter (DFP) to the outside diameter (DAE) of the shaft, is between 1.83 to 1.92.

16. A constant velocity joint according to claim 1, wherein each wheel (32) is movable only in rotation about the second axis (Y—Y) and along said axis.

17. A constant velocity joint according to claim 16, wherein each wheel (32) includes a substantially cylindrical inside surface (36), and wherein the railing surface (10) of the trunion (8) is substantially cylindrical.

18. A constant velocity joint according to claim 1, wherein the trunion (8) and the rolling surface (10) are fixed relative to the first axis (X—X).

19. A constant velocity joint according to claim 1, wherein the joint is a tripod joint.

* * * * *

UNITED STATES PATENT AND TRADEMARK OFFICE
CERTIFICATE OF CORRECTION

PATENT NO.         : 7,235,015 B2                                   Page 1 of 1
APPLICATION NO.    : 10/889932
DATED              : June 26, 2007
INVENTOR(S)        : Michel Margerie et al.

It is certified that error appears in the above-identified patent and that said Letters Patent is hereby corrected as shown below:

Col. 5, claim 5, line 2, please change [[(DSP)]] to (DSR)
Col. 6, claim 12, line 2, please change [[(35)]] to (38)
Col. 6, claim 13, line 3, please change [[(PP)]] to (RP)
Col. 6, claim 15, line 3, please change [[(DEP)]] to (DFP)
Col. 6, claim 17, line 3, please change railing to rolling Signed and Sealed this Seventh Day of April, 2009

JOHN DOLL
*Acting Director of the United States Patent and Trademark Office*

UNITED STATES PATENT AND TRADEMARK OFFICE
CERTIFICATE OF CORRECTION

PATENT NO. : 7,235,015 B2  
APPLICATION NO. : 10/889932  
DATED : June 26, 2007  
INVENTOR(S) : Michel Margerie et al.

Page 1 of 1

It is certified that error appears in the above-identified patent and that said Letters Patent is hereby corrected as shown below:

Col. 5, claim 5, line 22, please change [[(DSP)]] to (DSR)  
Col. 6, claim 12, line 6, please change [[(35)]] to (38)  
Col. 6, claim 13, line 12, please change [[(PP)]] to (RP)  
Col. 6, claim 15, line 21, please change [[(DEP)]] to (DFP)  
Col. 6, claim 17, line 32, please change ~~railing~~ to rolling This certificate supersedes the Certificate of Correction issued April 7, 2009.

Signed and Sealed this

Twenty-eighth Day of April, 2009

JOHN DOLL  
*Acting Director of the United States Patent and Trademark Office*